United States Patent Office 3,447,433
Patented June 3, 1969

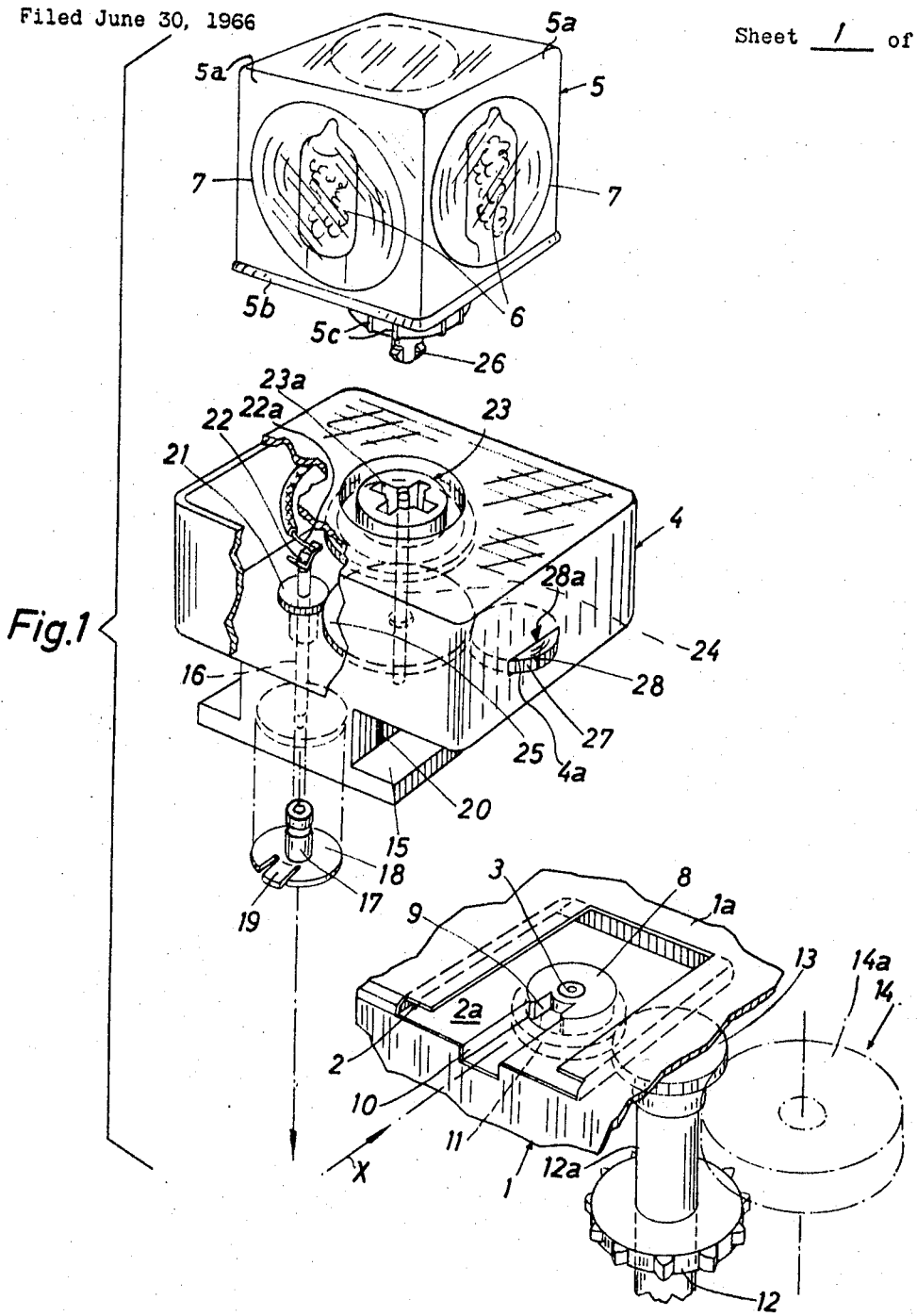

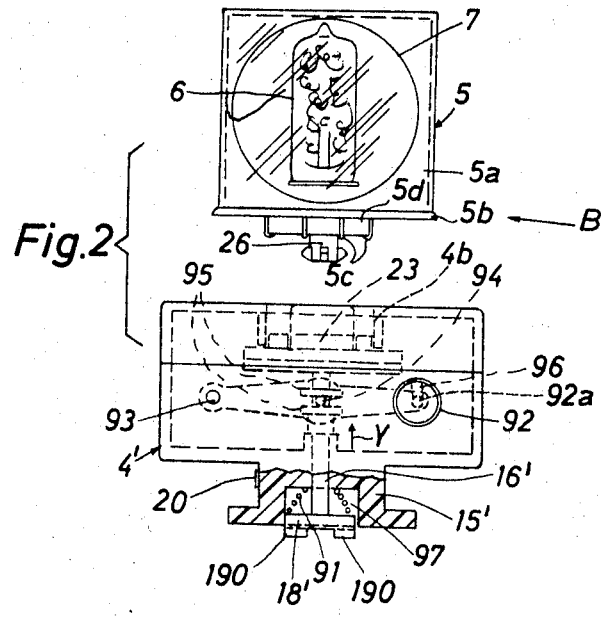
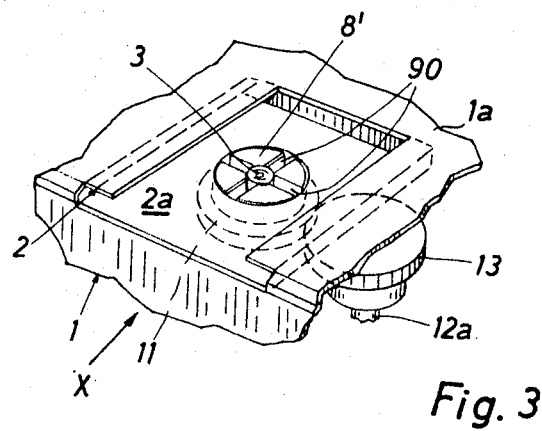

3,447,433
PHOTOGRAPHIC CAMERA WITH FLASH UNIT
Richard Wick, Grunwald, near Munich, Dieter Engelsmann, Unterhaching, Munich, and Alfred Winkler, Munich, Germany, assignors to Agfa-Gevaert Aktiengesellschaft, Leverkusen, Germany
Filed June 30, 1966, Ser. No. 561,853
Claims priority, application Germany, July 26, 1965, A 49,849; Aug. 4, 1965, A 49,907
Int. Cl. G03b 15/035; F21v 19/04
U.S. Cl. 95—11                                    28 Claims

ABSTRACT OF THE DISCLOSURE

The casing of a photographic camera has an accessory shoe which can receive the foot of a housing forming part of a flash unit provided with an indexible socket for multiple flash bulb containers. The camera casing accommodates a drive including a rotary clutch element in the shoe which is automatically engaged by a complementary clutch element in the foot when the latter is properly inserted into the shoe whereby the complementary clutch element indexes the socket and the multiple flash bulb container in response to manipulation of the film transporting mechanism.

---

The present invention relates to photographic cameras in general, and more particularly to improvements in photographic cameras which are provided with detachable flash units. Still more particularly, the invention relates to improvements in photographic cameras of the type disclosed, for example, in the copending application Ser. No. 550,805 of Richard Wick et al., filed on May 17, 1966, and entitled, "Flash Unit for Photographic Cameras."

The copending application Ser. No. 550,805 discloses a photographic camera whose casing is provided with an accessory shoe capable of accommodating the foot of a housing forming part of a flsh unit which supports a so-called "Flashcube" or another suitable multiple flash bulb container. The flash unit is provided with an manually operated drive or with a motor which can change the angular position of the container so as to place successive flash bulbs into position for making exposures with flash. A very important advantage of the just outlined flash unit is that it can be readily mounted on cameras which are not provided with means for directly supporting a "Flashcube" or another multiple flash bulb container. On the other hand, such flash units must always be furnished with a separate drive and preferably with indexing means for changing the angular position of the container subsequent to each exposure with flash.

Accordingly, it is an important objet of the present invention to provide a photographic camera which can be readily assembled with the housing of a flash unit for "Flashcubes" or analogous multiple flash bulb containers and wherein the position of the container may be changed in automatic response to a manipulation which is necessary for proper operation of the camera regardless of whether or not the exposure is made in daylight or with flash.

Another object of the invention is to provide a camera of the just outlined characteristics wherein the multiple flash bulb container can be indexed in response to customary manipulation of the camera despite the fact that the container is not mounted directly on or in the casing of the camera.

A further object of the invention is to provide a camera wherein the indexing of the multiple flash bulb container takes place in automatic response to manipulation of the film transporting unit and regardless of whether such film transporting unit is operated manually or by means of a motor.

An additional object of the invention is to provide a flash unit which may be utilized in a camera of the above-outlined type and to construct and assemble the flash unit in such a way that a multiple flash bulb container carried thereby may be indexed in automatic response to customary manipulation of a camera or by hand when the flash unit is used on conventional cameras.

Still another object of the instant invention is to provide a novel motion transmitting connection between a drive which is provided in the casing of a camera and a multiple flash bulb container which is carried by the housing of a flash unit capable of being attached to or detached from the camera casing.

A concomitant object of the invention is to provide a novel clutch which may be utilized to transmit motion between the drive means of my improved camera and the multiple flash bulb container of the flash unit.

Another object of the invention is to provide a photographic camera wherein the connection between the drive which is used to index the flash bulb container and the flash unit may be terminated at the will of the operator, in a very simple way, and with the exertion of a minimal force.

A further object of our invention is to provide a flash unit which automatically remains in optimum position with reference to the casing of a photographic camera as soon as the driving connection for the multiple flash bulb container is properly established in response to attachment of the flash unit to the casing of the camera.

An additional object of the invention is to provide a flash unit which, in addition to supporting a readily separable multiple flash bulb container, can also accommodate at least some additional component parts of the flash circuit and which can automatically eject the container in response to its detachment from the casing of a photographic camera.

A further object of the invention is to provide a flash unit which occupies very little room, which can remain attached to the casing of a camera when the latter is used to make exposures in daylight or in artificial light other than that produced by the flash bulbs carried by the flash unit, and which can be readily attached to and detached from all such cameras which are provided with standard accessory shoes.

An additional object of the invention is to provide a still camera or a movie camera which embodies a flash unit of the above outlined characteristics and wherein the provision of drive means for the multiple flash bulb container contributes little, if anything, to the bulkiness of its casing and/or to complicatedness and initial cost.

Briefly stated, one feature of our present invention resides in the provision of a photographic camera which comprises a casing, a flash unit detachably mounted on the casing and including a rotary multiple flash bulb container, and drive means carried by the casing and operatively connected with the flash unit for rotating the container, for example, in response to manipulation of the film transporting unit or in response to operation of the device which is customarily provided in photographic cameras to prevent double exposure of the same film frame.

The flash unit comprises a housing which is preferably provided with or connected to a standard foot slidable into and withdrawable from a standard accessory shoe provided on the top wall of the casing. The operative connection between the rotary container and the aforementioned drive means preferably comprises a claw clutch, a gear clutch or another suitable clutch which can transmit rotary motion subsequent to proper insertion of the foot into the accessory shoe. The clutch may comprise a first disk-shaped or otherwise configurated clutch element which is mounted in the casing, preferably in the space defined by the accessory shoe, and a second clutch element which is rotatably supported by the housing of the flash unit, preferably by the aforementioned foot, and is movable into and out of motion receiving engagement with the first clutch element. Such engagement may be terminated in automatic response to withdrawal of the foot from the accessory shoe or in response to manipulation of a separate actuating member provided on the flash unit. Such actuating member may simultaneously perform the additional function of effecting ejection of a spent flash bulb container at the will of the operator or in response to detachment of the flash unit from the casing of the camera.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawings, in which:

FIG. 1 is a fragmentary exploded perspective view of a photographic camera whose flash unit which is constructed and assembled in accordance with a first embodiment of our invention;

FIG. 2 is a partly elevational and partly sectional view of a modified flash unit; and FIG. 3 is a fragmentary perspective view of a casing which can be coupled to and readily separated from the housing of the flash unit shown in FIG. 2.

Referring to the drawings in detail, and first to FIG. 1, there is shown a portion of a still camera which comprises a casing 1 whose top wall 1a is provided with a standard shoe 2. The space defined by the shoe 2 accommodates a centrally located contact element 3 forming part of conductor means for the flash circuit. The shoe 2 can accommodate a standard foot 15 which can be slipped into engagement with the casing 1 by being moved in the direction indicated by an arrow X. The foot 15 forms part of or is adjustably connected to a housing 4 which in turn forms part of a flash unit A, the latter further including a multiple flash bulb container 5 here shown as a so-called "Flashcube" having four mutually inclined vertical sides 5a each located in front of a reflector 7. Each reflector is located behind a flash bulb 6. The base 5b of the container 5 carries a downwardly extending male coupling member 26 (hereinafter called plug) and four pairs of twin contacts 5c whose purpose is the same as that of the corresponding contacts disclosed in the aforementioned copending application Ser. No. 550,805 of Wick et al.

In the embodiment of FIG. 1, the container 5 is rotatable in response to operation of a film transporting unit 14 which is accommodated in the casing 1 of the camera and includes one or more film advancing sprockets 12. The drive for the container 5 further includes a clutch which comprises a first disk-shaped clutch element 8 rotatable about the axis of the contact element 3. The clutch element 8 is preferably recessed into the bottom panel 2a of the accessory shoe 2 and is provided with a segmental cutout or recess 9 which can be moved into registry with a complementary recess or cutout 10 provided in the bottom panel 2a. The motion transmitting connection between the film transporting unit 14 and the coupling element 8 includes a gear train including a first gear 13 which is affixed to the shaft 12a of the sprocket 12 and a second gear 11 which is rigid with the clutch element 8. The ratio of the gear train 11, 13 is such that the clutch element 8 completes one full revolution in response to transport of the film by a distance necessary to place a fresh film frame into registry with the lens system of the camera. The gear 13 meshes with a gear 14a which can be rotated by a suitable lever (not shown) or by a motor in a manner well known from the art of conventional cameras.

The aforementioned system of conductors further comprises a shaft 16 of square cross-sectional outline. This shaft 16 is rotatable in the housing 4 of the flash unit A and its lower end portion is connected with a second disk-shaped clutch element 18 by means of a sleeve 17 which is integral with the clutch element 18 and is slipped onto the lower end portion of the shaft 16. The clutch element 18 is preferably recessed into the underside of the foot 15 as indicated in FIG. 1 by broken lines. This clutch element 18 comprises a downwardly extending elastic projection or tongue 19 which extends into the recess 9 when the foot 15 is fully accommodated in the shoe 2 and when the clutch element 8 assumes the angular position shown in FIG. 1. During insertion of the foot 15 (arrow X), the tongue 19 first advances through the cutout 10 and thereupon enters the recess 9 provided, of course, that the clutch element 8 is held in requisite angular position. Otherwise, the operator preferably changes the angular position of the clutch element 18 until the tongue 19 actually snaps into the recess 9. Such rotation of the clutch element 18 can be carried out after the foot 15 is fully inserted into the shoe 2. If the tongue 19 does not immediately register with the recess 9, it simply undergoes deformation and bears against the top face of the clutch element 8 until the angular position of the clutch element 8 and/or 18 is changed sufficiently to allow for proper engagement between such elements in order to transmit rotary motion to the plug 26 and hence the entire container 5.

The device which transmits rotary motion from the driven clutch element 18 to the plug 26 comprises the aforementioned shaft 16 and sleeve 17, a gear 21 which is affixed to the shaft 16, a gear 25 which is mounted in the housing 4 and meshes with the gear 21, a shaft 24 which is journaled in the housing 4 and is coaxially affixed to the gear 25, and a female coupling member or socket 23 which is affixed to the shaft 24 and is provided with a cruciform depression or recess 23a for the prongs or teeth of the plug 26. The top end portion of the shaft 16 carries a sliding contact 22 which engages one terminal of a cable 22a connecting the shaft 16 with one of a selected pair of contacts 5c in each angular position of the container 5. The other contact of such pair of contacts 5c is then grounded through the housing 4, a contact 20 of the foot 15, and the shoe 2. The shaft 16 connects the cable 22a with the centrally located contact element 3.

If the foot 15 is slid into the shoe 2 by moving in the direction of the arrow X, the tongue 19 slides in the recess 10 and enters the recess 9 so as to establish a motion transmitting connection between the clutch elements 8 and 18. The plug 26 is then compelled to change its angular position in response to manipulation of the film transporting unit 14. The transmission ratio of the gear train 21, 25 is such that the container 5 is rotated through 90 degrees in response to each full revolution of the shaft 16, i.e., in response to advance of a fresh film frame into requisite position for exposure. This is due to the fact that the container 5 comprises four flash bulbs 6. Of course, and if the flash unit A is arranged to take containers with, say, six flash bulbs 6, the transmission ratio of the gear train 21, 25 will be changed so that each full revolution of the shaft 16 will result in an angular displacement of the plug 26 through exactly 60 degrees.

In order to enable the owner to utilize the flash unit A on cameras which do not comprise a system of gears 11, 13 or analogous motion transmitting means for the socket 23, the housing 4 of the flash unit A is preferably provided with its own drive for the socket 23. In the embodiment of FIG. 1, such drive includes a gear 27 which extends through a window 4a and may be turned by hand. The gear 27 meshes with the gear 25 and thus shares rotation of the shaft 24 in response to manipulation of the film transporting unit 14. If the foot 15 is slid into the accessory shoe 2 of a camera which does not have a clutch element 8 and cannot rotate the socket 23 in response to manipulation of the film transporting unit, the operator simpily manipulates the gear 27 to change the angular position of the container 5 subsequent to each exposure with flash or prior to each new exposure with flash. The gear 27 can be mounted directly on the shaft 24 or the gear 25 may extend from the housing 4 so that the gear 27 may be dispensed with. In the embodiment of FIG. 1, the gear 27 also serves as a flash bulb counter and is provided with a set of graduations 28 which can be placed into registry with a fixed marker or index 28a provided on the housing 4 so that the operator can determine the number of spent or unused flash bulbs 6. It is further clear that the drive which comprises the gear 27 can be provided with suitable detent means and/or with indexing means so that the operator will feel when a flash bulb 6 is moved to optimum position for making an exposure with flash. Such detent means and indexing means are fully disclosed in the aforementioned copending application Ser. No. 550,805 of Wick et al.

When the flash unit A is used on cameras having a standard shoe 2 but having no driving connection between the film transporting unit and the clutch element 18, the tongue 19 of this clutch element simply bears against the bottom panel 2a of the shoe and thereby insures that the flash unit cannot be accidentally displaced from its optimum position. Any changes in the angular position of the container 5 are then carried out by hand, either by rotating the container or by rotating the gear 27. The aforementioned detent means may be associated with the gear 27, with the gear 25, with the socket 23 and/or with the gear 21 and shaft 16.

Of course, the structure shown in FIG. 1 is susceptible of many modifications without departing from the spirit of our invention. For example, and as mentioned hereinabove, the clutch elements 8, 18 together constitute but one form of clutch means which may be utilized for transmission of motion from the film transporting unit 14 to the socket 23. Thus, such clutch could include a ratchet wheel provided on the foot 15 and a pawl provided in the shoe 2 and arranged to engage the ratchet wheel in response to proper attachment of the housing 4 to the casing 1. Alternatively, the clutch may include clutch elements in the form of gears which are caused to mesh when the foot 15 is fully inserted into the accessory shoe 2. A novel claw clutch which can replace the clutch elements 8, 18 will be described in conection with FIGS. 2 and 3. Still further, the film transporting unit 14 may be constructed and assembled in such a way that it is directly coupled to the socket 23 when the housing 4 is attached to the casing 1. It is equally within the purview of our invention to replace the gear train 11, 13 by a rack and pinion drive which can rotate the shaft 16 in response to manipulation of the film transporting unit 14 or to connect the film transporting unit with the socket 23. by means of a crank drive or the like. All such modifications of the embodiment shown in FIG. 1 will be readily understood by men skilled in this art without necessitating further illustrations.

It is further clear that the centrally located contact element 3 may be omitted if the camera is provided with a cord type flash holder. Also, the flash outlet for a cord type flash holder can be provided in addition to the centrally located contact element 3 so as to further enhance the versatility of the improved flash unit because the latter is then usable in connection with cameras having a centrally located contact element or with cameras with flash outlets for cord type flash holders.

At least some electrical components of the flash circuit, such as one or more batteries, resistors, capacitors and others, are preferably accommodated in and can be removed from the housing 4. However, it is equally possible to accommodate some or all such components in the casing 1. The manner in which one or more removable components of the flash circuit can be accommodated in the housing of the flash unit is fully disclosed in the afore-Wick et al. Said copending application further discloses the manner in which the housing may be assembled of two or more separable parts and the manner in which the foot 15 may be adjusted with reference to the housing 4 in order to enable the operator to produce special illuminating effects. Thus, the connection between the foot 15 and the housing 4 may include a hinge or the like which enables the operator to tilt the housing about an axis which is parallel with or normal to the optical axis.

Instead of utilizing a drive which includes the film transporting unit 14, the camera of our invention can be arranged to transmit rotary motion to the socket 23 in response to operation of a known device which prevents dual exposure of the same film frame. Thus, and when such device is moved from an inoperative to an operative position, it can change the angular position of the socket 23 by 90 degrees so as to automatically place a fresh flash bulb 6 into requisite position for making the next exposure with flash. The device which prevents dual exposure of a film frame can be arranged to rotate the socket 23 subsequent to release of the shutter mechanism.

When the present invention is embodied in a camera wherein the film transporting unit includes a spring motor or an electric motor, the socket 23 can be caused to change its angular position during the last stage of movement of the shutter mechanism to closed position or during stepwise advance of the film to place the next film frame into requisite position for making an exposure. In other words, the film transporting unit may but need not turn the container 5 during actual lengthwise movement of the film because it is equally possible to change the angular position of the container 5 prior to or following the movement of a fresh film frame into registry with the lens system.

As stated hereinbefore, the housing 4 of the flash unit A is preferably provided with a standard foot 15 which can be fitted into standard accessory shoes so that the flash unit can be used in the camera of FIG. 1 as well as on any other camera which is provided with a standard accessory shoe and has a centrally located contact element 3 and/or a flash outlet for cord type flash holders.

Referring now to FIGS. 2 and 3, there is illustrated a different still camera including a casing 1 provided with a standard shoe 2, and a flash unit B which comprises a housing 4' and a multiple flash bulb container 5. The drive for the clutch element 18' of the flash unit B comprises a modified clutch element 8' which surrounds a centrally located contact element 3 and is rotatable in response to manipulation of the film transporting unit (not shown) in the same way as described in connection with FIG. 1. FIG. 3 illustrates only the shaft 12a for the film-engaging sprocket and the gear train 11, 13. The top face of the clutch element 8' is formed with a substantially cruciform recess or depression 90 which can receive projections or claws 190 extending downwardly from the underside of the clutch element 18'. The number of projections 190 preferably does not exceed four, and each such projection is receivable in one of the four arms or branches of the recess 90. The arrow X again indicates the direction in which the foot 15' on the housing 4' is insertable into or removable from the shoe 2. An important feature of the structure shown in FIGS. 2 and 3 is that the male clutch element 18' is movable in a direction at right angles to the direction indicated by the arrow X, namely, in parallelism with the axis of the socket 23. The transmission ratio of the gear train 11, 13 is such that the clutch element 8' rotates the clutch element 18' through exactly 90 degrees whenever the operator manipulates the film transporting unit in order to place a fresh film frame into registry with the lens system. This is necessary because the clutch element 18' is rigidly connected with the socket 23 so that the latter shares not only all angular but also all axial movements of the clutch element 18′. As shown in FIG. 2, the clutch element 18′ is connected with the socket 23 by a shift 16′ which is reciprocable in the housing 4′ and may be moved in the direction indicated by an arrow Y in response to manual operation of an actuating member 92. This member 92 resembles a lever which is fulcrumed at 93 and carries a pin 94 extending into the space between two flanges 95 of the shaft 16′. An expansion spring 91 is accommodated in a chamber 97 provided therefor in the underside of the foot 15′ and bears against the clutch element 18′ to urge the latter against the clutch element 8′, it being assumed that the foot 15′ is fully accommodated in the accessory shoe 2 of the casing 1. As in the previously described embodiment, the shaft 16′ again constitutes a conductor which automatically engages the contact element 3 when the foot 15′ is received in the shoe 2 to such an extent that the clutch element 18′ is coaxial with the clutch element 8′. The construction of the container 5 shown in FIG. 2 is identical with that of the container which is illustrated in FIG. 1 and the manner in which the pairs of contacts 5c on the base 5b of this container can be connected with the ground (shoe 2) and with the centrally located contact element 3 is also the same as described in connection with FIG. 1. The contact 20 shown in FIG. 2 engages the shoe 2 and is conductively connected therewith as soon as the foot 15′ is properly inserted into the shoe.

The clutch element 8′ is recessed into the bottom panel 2a of the accessory shoe 2 and the spring 91 is compressed by the operator before the foot 15′ is moved in the direction of the arrow X in order to enter the space defined by the shoe. Once the projections 190 register with the recess 90, the spring 91 is free to expand and then maintains the clutch element 18′ in motion receiving engagement with the clutch element 8′. It will be seen that the clutch elements 8′, 18′ together constitute a simple claw clutch which can transmit motion from the film transporting unit to the socket 23 and thence to that container 5 whose plug 26 is received in the socket 23. The aforementioned compression of the spring 91 takes place in response to rocking of the actuating member 92 in a counterclockwsie direction, as viewed in FIG. 2, whereby such movement of the member 92 brings about upward movement of the clutch element 18′, shaft 16′ and socket 23. The operator releases the member 92 as soon as he feels that the foot 15′ cannot move any deeper into the shoe 2 whereby the spring 91 extends and shifts the clutch element 18′ in a direction counter to that indicated by the arrow Y, i.e., at right angles to the direction (arrow X) in which the foot 15′ is insertable into or withdrawable from the shoe 2. The actuating member 92 further comprises a stud 92a which extends through a slot 96 of the housing 4′. The length of the slot 96 determines the maximum angular displacement of the member 92 and hence the maximum axial displacement of the clutch element 18′ and socket 23. When the socket 23 is moved to its upper end position, the clutch element 18′ is fully received in the chamber 97 so that it cannot interfere with insertion or removal of the foot 15′ from the shoe 2. When the flash unit B is used in connection with a conventional camera having a standard shoe 2 but not the gear train 11, 13 and the clutch element 8′, the socket 23 must be rotated by a drive other than that including the film transporting unit, for example, by a drive including a gear (not shown) corresponding to the gear 27 of FIG. 1. Alternatively, the operator can rotate the container 5 by hand until the projections 190 snap into the adjoining arms of the recess 90. Of course, it is equally possible to provide the clutch element 8′ and/or 18′ with suitable detent means for automatically holding the one or both clutch elements in an angular position in which the projections 190 enter the recess 90 as soon as the foot 15′ is fully inserted into the shoe 2 and as soon as the operator releases the actuating member 92 so that the spring 91 can expand.

The actuating member 92 can be further utilized as one component of means for ejecting the container 5, i.e., for disengaging the plug 26 from the socket 23. As clearly shown in FIG. 2, the base 5b of the container 5 has a hub 5d which enters a recess 4b of the housing 4′ when the plug 26 extends into the socket 23. By lifting the socket 23 through the intermediary of the member 92, the operator can expel the hub 5d from the recess 4b to thereby separate the container 5 from the housing 4′. The plug 26 need not be frictionally held by the socket 23. The just described ejector enables the operator to separate the container 5 without necessitating bodily separation of the housing 4′ from the casing 1 and without necessitating the exertion of a pull upon the container. This is desirable when the operator wishes to replace a spent container 5 with a fresh container immediately following an exposure with flash, i.e., while the spent container is still hot.

The embodiment of our invention which is illustrated in FIGS. 2 and 3 is also susceptible of many further modifications. For example, the actuating member 92 may be omitted if the clutch element 18′ and the shoe 2 are provided with suitably inclined cam faces which cause the clutch element 18′ to compress the spring 91 when the foot 15′ is being inserted into the shoe 2. Also, the actuating member 92 may be arranged to retract the clutch element 8′. The recess 90 can be replaced by a diametral recess or by a three-armed recess; in such cameras, the clutch element 18′ need not comprise more than three projections 190. Furthermore, and as described in connection with FIG. 1, the clutch including the elements 8′, 18′ may be replaced by a gear clutch or by a clutch which comprises a ratchet wheel and a pawl.

A very important advantage of the clutch which is shown in FIGS. 2 and 3 is that the wear on its components during insertion or detachment of the flash unit B is reduced to a minimum and also that the clutch elements 8′, 18′ are invariably connected for transmission of rotary motion to the socket 23 as soon as the projections 190 snap into the recess 90 of the clutch element 8′. The spring 91 insures that the clutch element 18′ remains in motion receiving engagement with the clutch element 8′ unless the operator decides to terminate such engagement by rocking the actuating member 92.

What is claimed as new and desired to be protected by Letters Patent is:

1. In a photographic camera, a camera casing; a flash unit including a housing detachably mounted on and supported by said camera casing, and a disposable multiple flash bulb container rotatably and detachably carried by said housing; and drive means mounted in said casing and separably connected with said flash unit for rotating said container, said drive means comprising a first rotary clutch element mounted on said camera casing and means for intermittently rotating said first clutch element, said flash unit further comprising a second rotary clutch element separably engaging said first clutch element and an operative connection between said second clutch element and said flash bulb container.

2. A structure as set forth in claim 1, wherein said housing comprises a standard foot and said camera casing comprises a standard accessory shoe removably receiving said foot.

3. A structure as set forth in claim 1, wherein the means for intermittently rotating said first clutch element comprises a film transporting unit arranged to rotate said first clutch element through angles of predetermined magnitude in response to intermittent advance of the film.

4. A structure as set forth in claim 1, wherein said flash unit comprises a rotary socket operatively connected with said container and second drive means for rotating said socket independently of said first mentioned drive means, said flash unit further comprising means for transmitting rotary motion from said first mentioned drive means to said socket.

5. A structure as set forth in claim 1, further comprising a flash circuit including at least one component removably accommodated in said housing.

6. A structure as set forth in claim 1, wherein said operative connection comprises a rotary socket and wherein said flash bulb container comprises a plug removably extending into and rotatable with said socket.

7. A structure as set forth in claim 6, wherein said flash bulb container is a prismatic body having a plurality of mutually inclined sides, a reflector provided behind each of said sides, and a flash bulb installed in front of each reflector.

8. A structure as set forth in claim 1, wherein said casing comprises a first coupling member and said flash unit comprises a second coupling member connected with said housing and detachably engaging said first coupling member to thereby connect said flash unit to said casing.

9. A structure as set forth in claim 8, wherein said first coupling member is an accessory shoe and said second coupling member is a foot which is slidably received in said accessory shoe.

10. A structure as set forth in claim 8, wherein said second rotary clutch element is arranged to receive motion from said first clutch element upon full engagement between said first and second coupling members.

11. A structure as set forth in claim 10, further comprising separable first and second conductors respectively provided in said casing and in said flash unit and arranged to establish an electrical connection between said flash bulb container and said casing, said first conductor comprising a substantially centrally located contact element provided in said first coupling member.

12. A structure as set forth in claim 10, further comprising means provided in said flash unit for transmitting rotary motion from said second clutch element to said flash bulb container, said rotary motion transmitting means comprising a gear train driven by said second clutch element and a socket driven by said gear train, said container comprising a plug detachably but non-rotatably, connected with said socket.

13. In a photographic camera, a casing; a flash unit including a housing detachably mounted on said casing and a multiple flash bulb container rotatably and detachably carried by said housing; and drive means carried by said casing and operatively connected with said flash unit for rotating said container, said drive means comprising a first rotary clutch element mounted on said casing, a film transporting unit for rotating said first clutch element through angles of predetermined magnitude in response to intermittent advance of the film and a gear train between said first clutch element and said film transporting unit, said flash unit further comprising a second rotary clutch element receiving motion from said first clutch element and operatively connected to said flash bulb container.

14. In a photographic camera, a casing including an accessory shoe; a flash unit including a housing detachably mounted on said casing and including a foot removably extending into said shoe to thereby connect the flash unit to said casing, a rotary socket in said housing and a multiple flash bulb container rotatably and detachably carried by said housing, said container comprising a plug removably extending into and rotatable with said socket, and a prismatic body having a plurality of mutually inclined sides, a reflector provided behind each of said sides, and a flash bulb installed in front of each reflector; and drive means carried by said casing and operatively connected with said flash unit for rotating said container, said flash unit further comprising means for transmitting rotary motion from said drive means to said socket, said rotary motion transmitting means comprising a first rotary clutch element mounted in said foot and operatively connected with said socket and said drive means comprising a second rotary clutch element mounted in said shoe and arranged to rotate said first clutch element.

15. In a photographic camera, a casing comprising an accessory shoe; a flash unit comprising a housing including a foot slidably and removably received in said shoe to thereby connect said flash unit to said casing, and a multiple flash bulb container rotatably and detachably carried by said housing; and drive means carried by said casing and operatively connected with said flash unit for rotating said container, said drive means comprising a first rotary clutch element including a first disk rotatably mounted in said shoe and said flash unit further comprising a second rotary clutch element including a second disk rotatably mounted in said foot and arranged to receive motion from said first clutch element in response to full engagement between said foot and said shoe, said second disk being operatively connected with said flash bulb container to rotate the latter in response to rotation of said first disk when said foot is properly accommodated in said shoe.

16. A structure as set forth in claim 15, wherein one of said disks comprises a projection and the other disk is provided with a recess which receives said projection in response to full insertion of said foot into said shoe.

17. In a photographic camera, a casing comprising a first coupling member; a flash unit comprising a housing detachably mounted on said casing and including a second coupling member removably engaging said first coupling member to thereby connect said flash unit to said casing, and a multiple flash bulb container rotatably and detachably carried by said housing; and drive means carried by said casing and operatively connected with said flash unit for rotating said container, said drive means comprising a first rotary clutch element and said flash unit further comprising a second rotary clutch element arranged to receive motion from said first clutch element in response to full engagement between said coupling members, one of said clutch elements comprising an elastic projection and the other clutch element being provided with a recess accommodating said projection in response to proper engagement between said coupling members.

18. In a photographic camera, a casing comprising a first coupling member; a flash unit including a housing detachably mounted on said casing and provided with a second coupling member movable in a first direction into and from engagement with said first coupling member to thereby respectively attach and disconnect said flash unit from said casing, said flash unit further comprising a multiple flash bulb container rotatably and detachably carried by said housing; and drive means carried by said casing and operatively connected with said flash unit for rotating said container, said drive means comprising a first rotary clutch element and said flash unit further comprising a second rotary clutch element operatively connected with said container and arranged to receive motion from said first clutch element, one of said clutch elements being movable in a second direction into and out of engagement with the other clutch element.

19. A structure as set forth in claim 18, wherein said second direction is normal to said first direction.

20. A structure as set forth in claim 18, wherein said drive means comprises a film transporting unit arranged to rotate said first clutch element through angles of predetermined magnitude in response to stepwise advance of the film in said casing.

21. A structure as set forth in claim 18, wherein said one clutch element is said second clutch element and wherein said flash unit further comprises manually operated actuating means for moving said second clutch element in said second direction.

22. A structure as set forth in claim 18, wherein said clutch elements together constitute a claw clutch.

23. A structure as set forth in claim 18, wherein one of said clutch elements is provided with a substantially cruciform slot and the other clutch element comprises at least one projection which is movable into and from said slot in response to movement of said movable clutch element in said second direction.

24. A structure as set forth in claim 23, wherein said last mentioned other clutch element comprises a plurality of projections whose combined number is less than five.

25. A structure as set forth in claim 18, wherein said flash bulb container comprises a plurality of mutually inclined sides, a reflector located behind each of said sides, a flash bulb in front of each reflector, and a plug disposed centrally between said sides, said flash unit further comprising a socket detachably receiving said plug and rotatable therewith, and rotary motion transmitting means connecting said socket with said second clutch element.

26. A structure as set forth in claim 25, wherein said rotary motion transmitting means comprises a rigid connection between said socket and said second clutch element.

27. A structure as set forth in claim 26, wherein said one clutch element is said second clutch element and wherein said second direction is parallel with the axes of said second clutch element and said socket, said flash unit further comprising manually operated actuating means for moving said second clutch element in said second direction.

28. A structure as set forth in claim 27, wherein said actuating means is arranged to detach said container from said housing in response to disengagement of said second clutch element from said first clutch element.

References Cited
UNITED STATES PATENTS

| | | | |
|---|---|---|---|
| 3,080,804 | 3/1963 | Steineck | 95—11.5 |
| 3,335,651 | 8/1967 | Williams et al. | 95—11 |
| 3,353,465 | 11/1967 | Peterson et al. | 95—11.5 |

NORTON ANSHER, *Primary Examiner.*

FRED L. BRAUN, *Assistant Examiner.*

U.S. Cl. X.R.

240—1.3, 37.1